June 11, 1968     B. L. SINKEY ET AL     3,387,754
SPARE TIRE AND WHEEL CARRIER
Filed June 21, 1967     2 Sheets-Sheet 1

INVENTORS.
BARRY L. SINKEY
ROBERT L. CLIFFORD
BY
ATTORNEY

INVENTORS.
BARRY L. SINKEY
ROBERT L. CLIFFORD
BY

ATTORNEY

United States Patent Office 3,387,754
Patented June 11, 1968

3,387,754
SPARE TIRE AND WHEEL CARRIER
Barry L. Sinkey, 825 Dahlia St., Apt. 802, Denver, Colo. 80220, and Robert L. Clifford, 4060 Buckner Lane, Paducah, Ky. 42001
Filed June 21, 1967, Ser. No. 647,711
8 Claims. (Cl. 224—42.21)

ABSTRACT OF THE DISCLOSURE

A spare tire and wheel carrier adapted for attachment to the rear frame and tail gate of "Jeep" type vehicles for supporting a spare tire in an accessible and protected position. A pivotal mount to the frame is provided together with adjustable hook elements for engaging the tail gate where the tail gate and carrier may be moved cooperatively and without interference to raised and lowered positions.

Background of the invention

At the present time off-the-road vehicles of the "Jeep" type provide a mounting for a spare tire and wheel on the side of the vehicle. For most vehicle configurations this side mount increases the overall width of the vehicle. In back country use any extra width on the vehicle may prevent passage along narrow trails or past rocks and trees. Accordingly, a side mounted spare tire and wheel can present a disadvantage for some vehicle operations. Tires carried in the exposed side position have been damaged or have contributed to the immobilization of the vehicle. In order to avoid these shortcomings and to provide a carrier for a spare tire that would not be in such exposed position, others have previously recognized the desirability of carrying the spare tires at the front or at the rear of the vehicle. From an appearance standpoint a rear mounting is desirable, but provision should be made for maintaining personnel and equipment access at the rear tail gate of such vehicles. The applicants present a carrier mount mechanism which is intended to beneficially satisfy user requirements in this field.

Summary of the invention

The present invention provides a bracket that may be conveniently attached to the rear of a vehicle frame as a pivotal mount for side supports. The side supports which then may be moved to raised or lowered positions are attached to a wheel support bracket by bolts which also adjustably engage a pair of hooks. The hooks are adapted for engagement with the rolled top of a pivotally mounted tail gate to hold the carrier wheel and tire in operative position. The hinge for the tail gate and the pivot for the side supports are offset one from the other so that the spare tire carrier and tail gate disengage one from the other as the tail gate is lowered and moved into secure engagement when the tail gate is closed. With this arrangement a spare tire and wheel placed on the carrier can be moved to an upright carry position or a lowered non-interfering position beneath the lowered tail gate when it is desired to place or remove items in the vehicle bed.

Description of the drawings

The detailed features of an embodiment of the invention are shown in the accompanying drawings, in which.

Description of the preferred embodiment

On "Jeep" vehicles of the "Universal" type the spare tire is normally carried at the side of the vehicle. A support bracket is bolted to the side of the vehicle, and the wheel of a spare tire may be applied to the studs extending outwardly from the support bracket. As previously set forth, this side mounting can present problems respecting clearance and damage for owner-users. In order to provide a carrier for spare tires and wheels that will not be at such an exposed position, the applicants prefer to locate their carrier at the rear of the vehicle.

Figure 1:
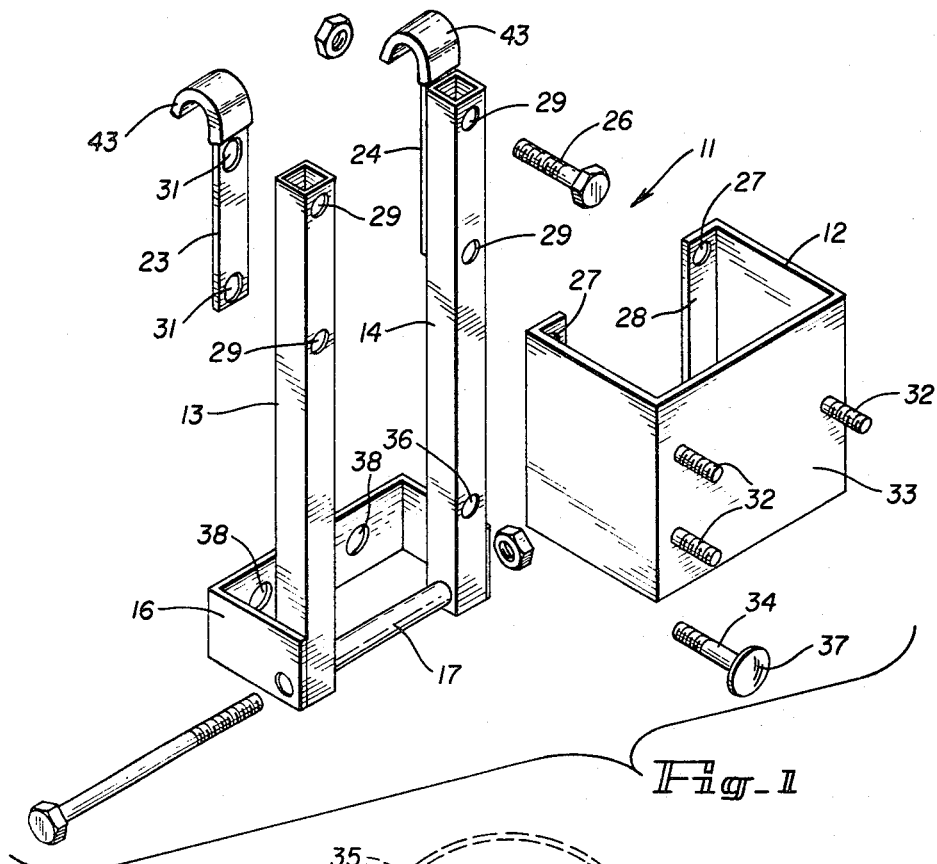
FIG. 1 is an exploded perspective showing elements of the invention in disassembled relation.

The elements of a preferred embodiment are shown in FIG. 1 where the carrier as a unit is designated by the numeral 11. The carrier elements include a wheel support bracket 12 and upright side supports 13 and 14 that are pivotally mounted to a U-shaped bracket 16 by use of a pin 17. Hooks 23 and 24 are applied to the upright supports 13 and 14 by bolts 26 passing through the openings 27 in a foot piece 28 of support bracket 12, the openings 29 in the upright supports 13 and 14 and the elongated openings 31 in the hooks 23 and 24. Studs 32 extend outwardly from the face 33 of support bracket 12 to be engaged through the lug holes in the spare wheel assembly. When the carrier 11 is assembled and a wheel and tire assembly 35 is applied to the carrier 11, conventional lug nuts will be engaged with the studs 32 to hold the wheel and tire assembly 35 on the carrier 11.

In order to prevent excessive vibration of the spare wheel and tire on the carrier 11, a dampener bolt 34 is provided which may be engaged in opening 36 in side support 14. Adjustment of the dampener bolt 34 will bring the head 37 of the dampener bolt into secure engagement with the side walls of the spare tire to hold it securely on the carrier 11. The carrier is itself securely mounted on the vehicle 15 by bolts or cap screws passing through the openings 38 in the U-shaped bracket 16. Preferably, the center distance for the opening 38 is such that this bracket 16 can be directly mounted to paired openings on the "Jeep" frame that are normally provided to receive a pintle hook hitch. When applied at this position, the carrier pivot 17 will be disposed below and away from the hinge 39 for the vehicle tail gate 41.

Figure 2:
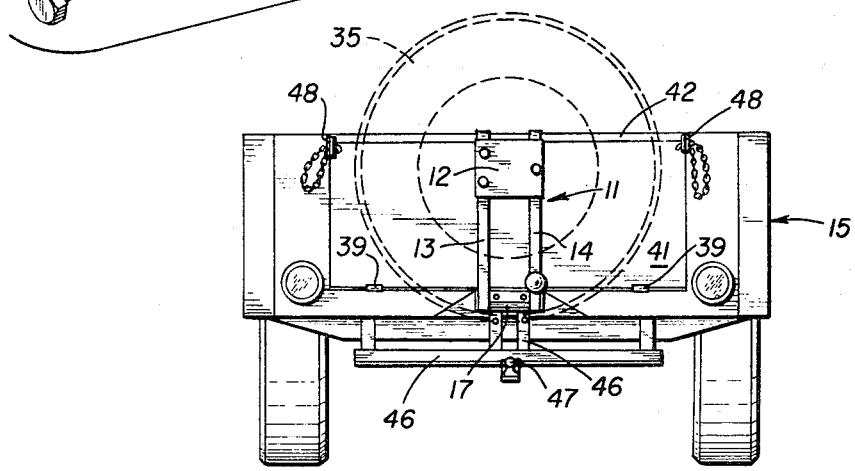
FIG. 2 is a rear elevation showing the wheel carrier elements in raised-engaged position.
Figure 3:
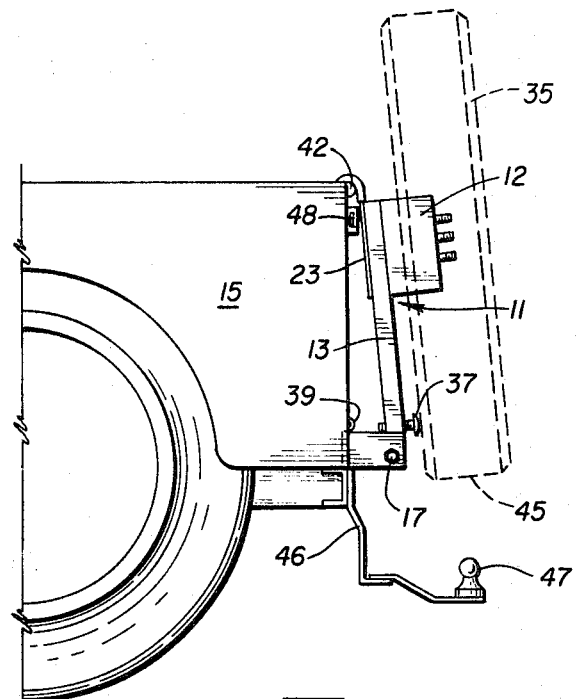
FIG. 3 is a side elevation showing the wheel carrier elements in raised-engaged position.

With the tail gate and carrier in the raised position, as shown in FIGS. 2 and 3, the hooks 23 and 24 may be engaged with the rolled top 42 of the tail gate 41. Since this engagement is intended to hold the carrier 11 in its operative or raised position, the hooks 23 and 24 are preferably provided with a covering 43 of rubber or plastic protective material. This covering is shown as applied to the hook 24 in FIG. 1, and is further shown applied to the hook 23 in FIG. 4. When the carrier 11 is initially installed, the hooks 23 and 24 are brought into secure engagement with the top 42 and tail gate 41 before nuts are tightened on the bolts 26. Elongated openings 31 in the hooks 23 and 24 provide an adjustment to assure tight and secure engagement between the carrier hooks and the tail gate. After adjustment has been made and secured, the tail gate and carrier may be moved to raised or lowered positions without interference.

Figure 4:
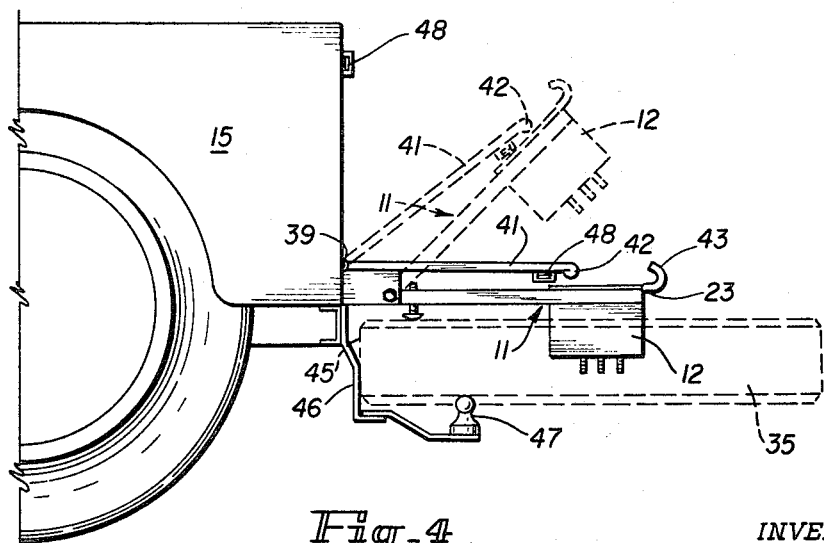
FIG. 4 is a side elevation with parts shown in alternate position illustrating the wheel carrier elements in lowered and intermediate positions.

The cooperative placements for the tail gate and carrier at raised, intermediate and lowered positions are shown in FIGS. 3 and 4. When the carrier and tail gate are raised the spare tire and wheel assembly 35 will be in a non-interfering protected position for use. When the tail gate is lowered as shown in FIG. 4, the hooks 23–24 and the rolled top 42 of the tail gate 41 will be disengaged one from the other due to the eccentric positioning of their respective pivots 39 and 17. The bottom thread 45 of the tire 35 will come into engagement with trailer hitch support components 46 of the vehicle, but the standard trailer ball hitch 47 supported thereby will be in a non-interfering position with respect to the tire and wheel.

When the tail gate and carrier are again raised, the tail gate can be engaged against the carrier hook members at an intermediate position as shown in dotted outline on FIG. 4. Further movement of the carrier toward its upright position will bring the rolled top 42 of the tail gate 41 and the hooks 23–24 into secure engagement to retain the carrier in its at-rest or use position when the tail gate chain is engaged in the latch elements 48. When the carrier is in the operative position, the main weight of the carrier and the wheel and tire assembly will be transmitted to the pivot pin 17 and by the bracket 16 directly to the vehicle frame.

In general, the hook to tail gate engagement merely keeps the carrier from falling back and down to its lowered position. Where a rubber or plastic cover 43 is provided on the hooks 23 and 24, no damage occurs to the tail gate, and all rattling or vibration noises are eliminated. The carrier 11, accordingly, provides a sturdy and efficient means for the protected transport of a spare wheel assembly. The complete carrier unit can be fabricated and sold economically, and the unit is easy to install and use.

While a single embodiment of the invention has been shown and described, it should be apparent that the features of such invention and combination are adaptable to similar installations on other vehicles. Any modifications, adaptations, or improvements coming within the scope of the appended claims are to be considered a part of this invention.

We claim:

1. A spare tire and wheel carrier adapted for mounting adjacent a tail gate that is rotatable about a lower hinge to horizontally disposed open positions and a vertically disposed closed position comprising a bracket extending rearwardly from said vehicle, a pivot on said bracket located in offset position with respect to the axis for the tail gate hinge, a support engaged to said pivot for rotational movement thereabout, a hook on said support for engagement with the free end of said tail gate when the tail gate is in the closed position to hold said support in an operative use position, and means on said support for mounting a spare vehicle wheel, said offset pivot and hinge axes being disposed to move said hook and the free end of said tail gate away from engagement as the tail gate is opened.

2. Structure as set forth in claim 1 and further comprising adjusting means operative between said hook and support for changing the effective length thereof.

3. Structure as set forth in claim 1 wherein paired supports and a plurality of hooks are provided.

4. Structure as set forth in claim 1 and further comprising a protective cover of resilient material on said hook to prevent damage and vibration effects between said tail gate and hook.

5. Structure as set forth in claim 1 and further comprising a spare wheel support bracket applied to said support.

6. Structure as set forth in claim 5 and further comprising adjustment means operative between said hook and support for changing the effective length thereof, and a fastener element for holding said spare wheel support bracket, support and hook each to each in desired adjusted position.

7. Structure as set forth in claim 1 wherein said pivot is disposed below and rearwardly with respect to the axis of said tail gate hinge.

8. Structure as set forth in claim 6 wherein said pivot is disposed below and rearwardly with respect to the axis of said tail gate hinge.

References Cited

UNITED STATES PATENTS

| 1,974,599 | 9/1934 | Bradford | 224—42.21 X |
| 3,343,736 | 9/1967 | Sellers | 224—42.21 X |

GERALD M. FORLENZA, *Primary Examiner.*

R. BALLANTYNE, *Assistant Examiner.*